(12) United States Patent
Schukalski et al.

(10) Patent No.: US 12,535,125 B2
(45) Date of Patent: Jan. 27, 2026

(54) ADJUSTMENT ASSEMBLY FOR AN ADJUSTMENT DRIVE

(71) Applicant: Brose Fahrzeugteile SE & Co. Kommanditgesellschaft, Coburg, Coburg (DE)

(72) Inventors: Jürgen Schukalski, Küps (DE); Andreas Diemar, Benshausen (DE); Peter Hausmann, Coburg (DE); Andreas Deckert, Gellershausen (DE); Hans-Jörg Birkefeld, Coburg (DE); Jochen Hofmann, Marktgraitz (DE); Renee Dietzel, Coburg (DE); Kevin Hertha, Sonnefeld (DE); Jürgen Hergenröder, Lichtenfels (DE); Wolfgang Wachter, Burkersdorf (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 0 days.

(21) Appl. No.: 18/554,386

(22) PCT Filed: Apr. 6, 2022

(86) PCT No.: PCT/EP2022/059047
§ 371 (c)(1),
(2) Date: Oct. 30, 2023

(87) PCT Pub. No.: WO2022/214511
PCT Pub. Date: Oct. 13, 2022

(65) Prior Publication Data
US 2024/0191790 A1    Jun. 13, 2024

(30) Foreign Application Priority Data

Apr. 9, 2021   (DE) .................... 10 2021 203 552.3

(51) Int. Cl.
*F16H 25/24*  (2006.01)
*B60N 2/06*   (2006.01)

(52) U.S. Cl.
CPC .............. *F16H 25/24* (2013.01); *B60N 2/067* (2013.01); *F16H 2025/249* (2013.01)

(58) Field of Classification Search
CPC ............. F16H 25/2006; F16H 25/2009; F16H 25/2003; F16H 25/24; F16H 2025/249
See application file for complete search history.

(56) References Cited

U.S. PATENT DOCUMENTS 3,081,644 A  *  3/1963  Hudgens .......... B29C 45/14754
                                                    313/118
10,385,948 B2   8/2019  Nakayama et al.
(Continued)

FOREIGN PATENT DOCUMENTS

DE          872701 C        4/1953
DE      102010001844 A1     8/2011
(Continued)

OTHER PUBLICATIONS

ISA European Patent Office, International Search Report Issued in Application No. PCT/EP2022/059047, Aug. 8, 2022, WIPO, 4 pages.

Primary Examiner — Gregory Robert Weber
(74) Attorney, Agent, or Firm — McCoy Russell LLP

(57) ABSTRACT

It is provided an adjustment assembly for an adjustment drive of a motor vehicle, having a first adjustment part having a first screw thread, and a second adjustment part having a second screw thread, which is in engagement with the first screw thread, wherein at least one of the screw threads has a plastic coating. The plastic coating covers more than 50% of the at least one screw thread.

13 Claims, 7 Drawing Sheets

(56) References Cited

U.S. PATENT DOCUMENTS

2011/0308340 A1    12/2011  Bosecker et al.
2015/0204383 A1*    7/2015  Ishii .................... F16H 25/24
                                                        264/267
2018/0105073 A1     4/2018  Hoffmann et al.

FOREIGN PATENT DOCUMENTS

DE      102012204312 A1 *  9/2013   ......... F02M 37/0011
DE      102017102286 A1 *  8/2018
EP           2396191 B1    5/2016
JP          2018044677 A   3/2018
WO          2016150790 A1  9/2016

* cited by examiner

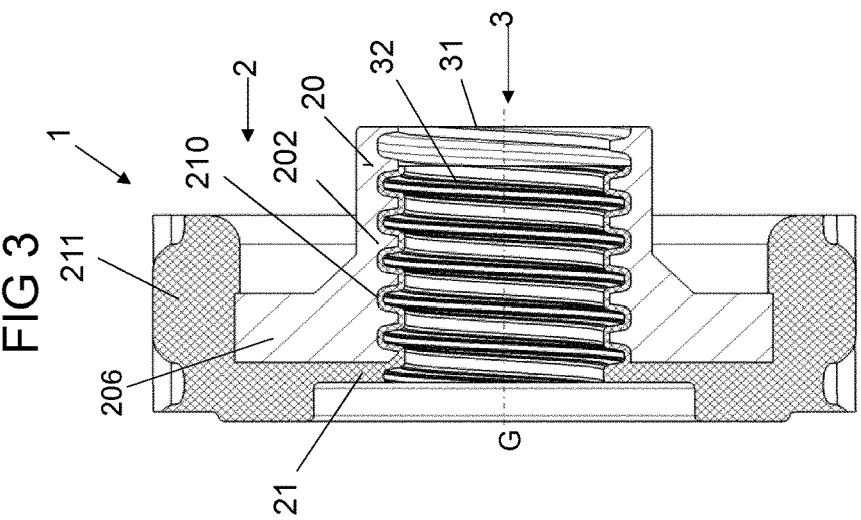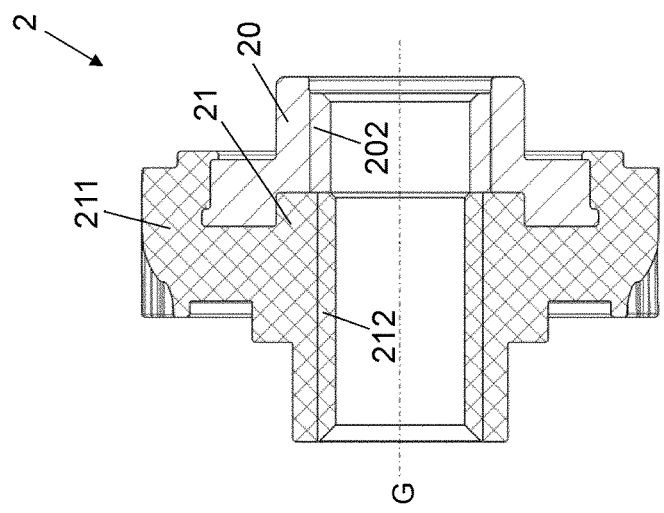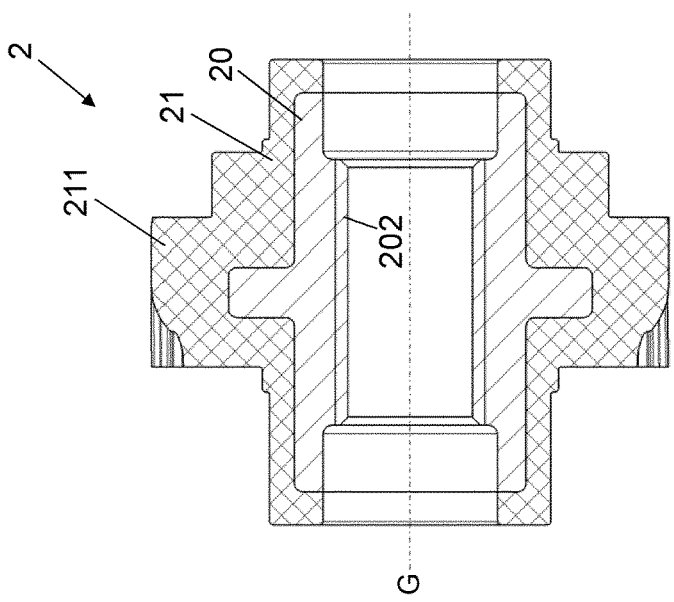

ADJUSTMENT ASSEMBLY FOR AN ADJUSTMENT DRIVE

CROSS REFERENCE TO RELATED APPLICATIONS

The present application is a U.S. National Phase of International Application No. PCT/EP2022/059047 entitled "ADJUSTMENT ASSEMBLY FOR AN ADJUSTMENT DRIVE" and filed on Apr. 6, 2022. International Application No. PCT/EP2022/059047 claims priority to German Patent Application No. 10 2021 203 552.3 filed on Apr. 9, 2021. The entire contents of each of the above-listed applications are hereby incorporated by reference for all purposes.

BACKGROUND

The disclosure relates to an adjustment assembly for an adjustment drive of a motor vehicle and a method for producing an adjustment part for the adjustment assembly.

Such an adjustment assembly comprises a first adjustment part having a first screw thread and a second adjustment part having a second screw thread, which is in engagement with the first screw thread.

Usually, adjustment drives are used in motor vehicles that have an adjustment assembly according to the solution for a longitudinal seat adjustment of a motor vehicle seat with an adjustment rail which is longitudinally adjustable relative to a rail fixed to the body. The first adjustment part is usually rotationally driven via external gearing by a drive worm connected to a drive device. Via the engagement of the screw threads of the first and the second adjustment part, the driving force is transmitted from the first adjustment part to the second adjustment part, whereby the second adjustment part can be adjusted in translation. The translational adjustment of the second adjustment part can cause an adjustment of the adjustment rail in relation to the rail fixed to the body.

A spindle nut or a screw wheel is often used for the first adjustment part and a spindle for the second adjustment part. In normal operation, the adjustment assembly should be able to be operated as quietly as possible and should be configured to be able to absorb axial forces occurring, for example, in the event of a crash. It is known that adjustment parts made of plastic can be operated with low noise. However, in the event of a crash, plastic can be deformed, such that the adjustment assembly may no longer be usable after a crash. It is also known that adjustment parts made of steel can absorb axial forces occurring in the event a crash. However, such adjustment parts can cause unwanted noises, such as squeaking, during normal operation.

In a spindle drive known from EP 2 396 191 B1, the spindle nut is formed by a hybrid spindle nut. This has a functional part made of plastic arranged in the force flow between the drive screw and the spindle and a strength part made of hard metal, which is configured to divert crash forces from the adjustment rail into the spindle. The functional part and the strength part are arranged axially next to each other along the screw thread axis.

In an adjustment device known from WO 2016/150790, plastic has been introduced into the spindle nut for noise optimization. For this purpose, a double-threaded spindle nut has been proposed, the first screw turn of which is made of steel and the second screw turn of which is made of plastic, such that steel and plastic are arranged axially alternately next to each other.

The fact that at least one of the first and second screw threads has a plastic coating can reduce unwanted noise during operation of the adjustment assembly and at the same time provide for a high resistance of the at least one screw thread in the event of a crash.

In principle, manufacturers want to reduce the weight of an adjustment assembly and save installation space. In addition, an adjustment assembly should be easy and inexpensive to manufacture with dimensions within the required tolerances.

SUMMARY

The object underlying the proposed solution is to provide an improved adjustment assembly.

This object is achieved according to a first aspect of the solution by an adjustment assembly with features as described herein. According to this, the plastic coating covers more than 50% of the at least one screw thread.

Covering more than 50% of the at least one thread with plastic eliminates the likelihood of accidental contact occurring between portions of the threads not covered with a plastic coating. Such unwanted secondary contacts can be caused by tilting of the adjustment parts relative to each other, which can produce unwanted noises such as squeaking.

Tribological properties include, but are not limited to, the friction between the first and second adjustment parts, the wear of the adjustment assembly, the efficiency that can be achieved when the adjustment assembly is in operation and the amount of noise generated by the adjustment assembly when in operation. Plastic may have lower sliding friction and/or static friction than metal. If the friction of the first and second adjustment parts against each other is reduced, wear of the adjustment assembly due to prolonged operation can also decrease. Reduced friction can also mean that less energy has to be used to operate the adjustment assembly, such that higher efficiency can be achieved. If adjustment parts made of metal are used, it may be necessary to use lubricants to enable quiet operation. Plastic, on the other hand, can enable low noise operation even without lubricants.

It is therefore intended to improve the tribological properties, in that the plastic coating covers over a percentage of 50% of the at least one screw thread. In particular, it can be advantageously provided that the percentage is as far above 50% as possible. By covering the at least one screw thread with the plastic coating, an arrangement can be created on which a functional element for improving the function, namely the plastic coating, and a strength element, namely the at least one thread, for example made of steel, for improving the strength, are provided radially separated from each other. This is an improvement over the prior art in that it is known to have elements for function and elements for strength that are axially separated, which is associated with an increased need for installation space. In the case of radial separation, the axial length of the adjustment part can be made significantly shorter. For example, a first adjustment part configured as a spindle nut is conceivable and possible, which is 4 to 5 times shorter than adjustment parts known from the prior art.

In order to create a simple and cost-effective manufacture of the adjustment assembly with dimensions within the desired tolerances, it may be provided that the plastic coating covers less than 100% of the at least one screw thread. The fact that the plastic covering does not cover 100% of the at least one screw thread may be due to the fact that the adjustment assembly has been manufactured using the method for producing the adjustment assembly according to a second aspect of the solution. The details of the method will be discussed below.

In one embodiment, the plastic coating covers the at least one screw thread almost completely. In particular, the plastic coating may cover the at least one screw thread to within one rotation, between one and two rotations, or to a maximum of two rotations of the at least one screw thread. For example, more than 80% of the at least one screw thread can be covered with the plastic coating. The at least one screw thread can be between 80% and 99%, in particular between 80% and 90%, or between 80% and 85% covered by the plastic coating. Such covering can optimize the tribological properties and at the same time enable simple and cost-effective production. The percentages given may refer in particular to a length of the at least one screw thread.

The at least one screw thread can comprise a spiral thread. One revolution of 360° along the spiral screw turn is referred to in this text as one rotation of the screw turn. N rotations therefore denote a revolution of N times 360° along the spiral screw turn. A lowest point of the screw turn can be formed by a screw thread base and a highest point of the screw turn by a screw thread tip. The screw thread base and the screw thread tip can be connected via flanks. A shape of the screw thread base and the screw thread tip, for example flat or tapered, and of the flank, for example steep or shallow, can determine a profile of the at least one screw thread. A variety of combinations of screw thread tips, bases and flanks are conceivable and possible. Known examples of profiles are, for example, a trapezoidal profile in which the screw thread base and the screw thread tip are flat and connected by sloping flanks that widen the screw turn in the direction of the screw thread tip, or a triangular profile in which the screw thread base and the screw thread tip are pointed and also connected by sloping flanks that widen the screw turn in the direction of the screw thread tip. In a sectional view of the screw thread along the screw thread axis, the two flanks and the associated screw thread tip together form tooth-like projections, such that in the following we can refer to screw thread teeth of the at least one screw thread to characterize a profile of the at least one screw thread.

The fact that the at least one screw thread is covered by the plastic coating may mean that the screw turn of the at least one screw thread is covered by the plastic coating. The plastic coating can therefore extend in particular over the screw thread base, the flanks and the screw thread tip.

In one embodiment, the at least one screw thread has a first portion covered by the plastic coating and a second portion not covered by the plastic coating. In particular, the first and the second portion can each be contiguous. The at least one screw thread can, for example, have a length of N rotations. The first portion can then have a length of N-x rotations and the second portion can have a length of x rotations.

The number N can assume values over two, i.e. 2.50 or 6.75 or 100.00, for example. Thus, N can be above 2.00 and up to and including 100.00. Higher values of N are of course conceivable and possible. The at least one screw thread can thus have a number of complete 360° rotations and a number of fractions of rotations less than 360°, which can be provided in the at least one screw thread, in particular at at least one of the ends, and in which the screw turn can optionally be chamfered in order to facilitate engagement of another screw thread, for example when screwing in or screwing on.

The number x can assume values of one or more, i.e. 1.00 or 1.25 or 1.50 or 1.75 or 2.00, for example. For example, x can be between 1.00 and 4.00 under the condition x/N<0.5. Higher values of x are of course conceivable or possible if the condition x/N<0.5 is met. If necessary, the condition can also be formulated more strictly to enable simple and cost-effective production of the adjustment assembly with dimensions in the desired tolerances. In particular, the condition can be x/N<0.2 or x/N<0.15 or x/N<0.1.

In one embodiment, the second portion has an axial length that corresponds to at least one rotation of the screw turn, in particular at most four rotations of the screw turn, of the at least one screw thread. Equivalently or alternatively, the second portion has an axial length that is at most 20%, in particular at most 15%, in particular at most 10%, of an overall length of the at least one screw thread. The second portion can have an axial length corresponding to at most twice or more than twice, for example three times or at most four times the distance between two screw thread tips (adjacent to each other in section) of the at least one screw thread. The fact that the second portion is more than one rotation of the screw turn may have the advantage that the production of the adjustment assembly is easily and precisely possible even if a pitch of the at least one screw thread is very steep. If the pitch of the at least one screw thread is shallower, the second portion can be less than two rotations of the screw turn.

The second portion can thus be shorter than two rotations. In particular, the second portion can have an axial length that corresponds to less than twice the distance between two screw thread tips of the at least one screw thread. In one embodiment, the second portion has an axial length that corresponds to 1.50 times or 1.75 times or 3.75 times the distance between two screw thread tips of the at least one screw thread. With an axial length corresponding to 1.00 times the distance between two screw thread tips of the at least one screw thread, the tribological properties of the at least one screw thread can be maximized under the condition of simpler cost-effective manufacture with dimensions within the desired tolerances. With an axial length corresponding to 1.50 times or 1.75 times or 3.75 times the distance between two screw thread tips of the at least one screw thread, a chamfered portion may additionally be included in the second portion such that the at least one screw thread can be arranged more easily on a mating screw thread of a receiving body during production. A chamfered portion can denote a portion where adjacent screw thread tips have different heights. Such a portion can be produced by chamfering the at least one screw thread. If a chamfered portion is used, the production can be carried out more easily with a negligible restriction on the optimization of the tribological properties.

The second portion can be arranged on one of the ends of the at least one screw thread. In one embodiment, the first portion is arranged on a first end of the at least one screw thread. The second portion can be arranged on a second end of the at least one screw thread, which is opposite the first end. This allows an outer element to be molded onto the plastic coating at the first end on the first portion, which may be integrally formed with the plastic coating. At the second end, in one embodiment, the plastic coating does not extend to an end face of the at least one screw thread, such that a gap is formed there between a further screw thread in engagement with the at least one screw thread, the profile of which gap corresponds to a profile of the plastic coating. In particular, the gap can be exactly as large as the thickness of the plastic coating. For example, the thickness can be in a range from 0.1 mm to 0.5 mm, in particular 0.3 mm and/or 1% to 10%, in particular 5% of the diameter of the at least one screw thread.

In one embodiment, the plastic coating has a constant thickness. The plastic coating can therefore fit like skin against a profile of the at least one screw thread. In particular, the plastic coating can follow a contour of the at least one screw thread. This can mean that the plastic coating covers the circumferential screw turn and in particular also the circumferential screw thread tip of the at least one screw thread. Thus, more than 50% of the at least one screw thread can be covered by the plastic coating in one contiguous portion.

In one embodiment, the plastic coating forms the profile of the at least one screw thread. This may mean that the at least one screw thread has a profile, for example a trapezoidal profile, covered by the plastic coating, wherein the plastic coating forms a profile that is different from the profile of the at least one screw thread. The profile forming the plastic coating may, for example, have wider and/or higher teeth than the profile of the at least one screw thread. In one embodiment, the profile of the at least one screw thread forms a screw thread tooth root for each screw thread tooth formed by the plastic coating, wherein the plastic coating forms a screw thread tooth body molded onto the screw thread tooth root. A geometric shape of the screw thread tooth body may differ from that of the tooth root. For example, the screw thread tooth root can be trapezoidal and the screw thread tooth body can be triangular. Thus, the profile of the at least one screw thread may be different from the profile formed by the plastic device, such that the profile of the at least one screw thread is shaped or determined by the plastic coating.

In one embodiment, the at least one screw thread and the plastic coating on the at least one screw thread have identical and/or different flank angles. The flank angles can be dimensioned to the screw thread axis. Different flank angles can, for example, provide better support for a profile formed by the plastic coating on the at least one screw thread. Likewise, the wear of the at least one screw thread can be reduced in a more targeted manner by using different flank angles. If the at least one screw thread and the plastic coating on the at least one screw thread have identical and different flank angles, the flank angles may be identical in at least one portion of the at least one screw thread and different in at least one other portion of the at least one screw thread.

In one embodiment, a thickness of the plastic coating varies along the at least one screw thread. In particular, the thickness of the plastic coating can vary periodically. Such an embodiment may differ from an embodiment in which the plastic coating has a constant thickness in that the thickness assumes specific values at specific, recurring locations of the at least one screw thread. For example, a thickness of the plastic coating may vary periodically by being thicker at screw thread tips and/or at screw thread bases than at a flank of the at least one screw thread. It is also conceivable and possible that the thickness of the plastic coating increases constantly towards one end.

In one embodiment, the plastic coating has a greater thickness on a screw thread flank of the at least one screw thread facing a load end of the at least one screw thread than on a screw thread flank of the at least one screw thread facing away from the load end of the at least one screw thread. This can mean that the plastic layer on one flank of a screw thread tooth is thicker than on the other flank of the screw thread tooth. The load end may be one of the ends of the at least one screw thread. In particular, the load end is an end of the at least one screw thread from which a load acts on the at least one screw thread. For example, this may be a force that causes a vehicle seat to be lifted via the at least one screw thread in an adjustment assembly. Such an asymmetric thickness along the thread turn can make it possible to specifically protect the at least one screw thread from wear.

Additionally or alternatively, a thickness of the plastic coating may vary periodically by the plastic coating forming a profile whose flanks have a pitch angle that is shallower than a pitch angle of the flanks of the at least one screw thread. Thus, the tribological properties of the at least one screw thread can be improved by the plastic coating, wherein at the same time a flat support of the plastic profile over the flanks of the at least one screw thread can be realized in the event of a crash or under another high load. Surface pressure on the plastic coating can thus be minimized such that the plastic profile is not subjected to bending under load.

One embodiment of the at least one screw thread and the plastic coating that realizes these advantages is to provide, as described above, that the at least one screw thread is a trapezoidal screw thread and the plastic coating on the at least one screw thread forms a plastic screw thread with a triangular profile.

In one embodiment, the at least one screw thread has a first profile shape on a first profile portion and a second profile shape on a second profile portion, which is different from the first profile shape. The different profile shapes can be optimized for different functions. For example, it is conceivable and possible to provide different profile shapes on the first portion. Likewise, the profile shapes of the first and second portions of the at least one screw thread may differ.

In one embodiment, the at least one screw thread is single-threaded. In particular, the first or the second screw thread can be single-threaded. It is preferred that the first and the second screw threads are single-threaded because installation space can be saved by providing as few screw turns as possible. However, more than 50% of several screw threads of a multi-threaded screw thread can in principle also be covered by the plastic coating and possibly less than 100% if such an adjustment assembly is desired.

In one embodiment, the first adjustment part is a spindle nut and the second adjustment part is a spindle. The spindle nut may be in engagement with the second screw thread of the spindle via the first screw thread for adjusting the spindle. A rotation of the spindle nut can cause a translational adjustment of the spindle. In normal operation, rotational forces can act between the first and second adjustment parts along the direction of rotation of the first adjustment part, which are caused by friction between the screw threads. The rotational forces can be amplified in prior art adjustment parts by tilting relative to each other. In addition, an axial force can act on the second adjustment part along the screw thread axis, which causes the translational adjustment of the second adjustment part. The rotational forces in particular can cause undesirable noise development, which can be suppressed by the plastic coating placed between the screw threads. In a portion of the at least one screw thread in which no plastic coating is arranged, rotational forces may possibly occur due to accidental tilting of the adjustment parts relative to each other, wherein a probability of occurrence can be minimized by ensuring that a portion of the at least one screw thread covered by the plastic coating is as large as possible. Since the coating of the at least one screw thread with plastic enables a shortened design of the adjustment part, rotational forces are additionally minimized, if necessary, because the probability of accidental tilting decreases with decreasing length of the adjustment part. The deflection forces would then have to be very large because the adjustment part is shortened as a lever arm. In addition, the shorter design also reduces the likelihood of the first and second adjustment parts jamming.

In one embodiment, the first and/or the second adjustment part are made of metal, in particular steel or brass. The first and second adjustment parts may be a steel nut and a steel spindle. In principle, it is desirable to provide a material for the first and second adjustment parts that is suitable for absorbing high loads, such as crash forces. Of course, a material made of particularly hard plastic can also be provided for this purpose.

In one embodiment, the at least one screw thread has at least one recess. The at least one recess may be elongated along a screw thread axis of the at least one screw thread. The at least one recess may form a groove extending along a screw thread axis through the circumferential thread turn of the at least one screw thread. The thread turn of the at least one screw thread can be interrupted at the at least one recess. This means that the at least one screw thread may be incomplete to implement the at least one recess. The at least one recess can also be formed by arbitrarily shaped defects in the at least one screw thread, which are configured to allow plastic melt to penetrate into them. Additionally or alternatively, at least one recess may be provided that extends radially to the screw thread axis in the at least one screw thread. It is conceivable and possible, for example, that the at least one recess is formed by a depression in the at least one screw thread formed radially to the screw thread axis.

The at least one recess can be filled with plastic. The same plastic that was used to produce the plastic coating may have been used to fill the at least one recess. In other words, the plastic coating and the filling of the at least one recess may be formed integrally. The portion of the plastic coating filling the at least one recess can form a retaining element molded onto the plastic coating, via which the plastic coating is held in a form fitting manner on the at least one screw thread. This may allow the plastic coating to better resist torsional forces that could cause rotation relative to the at least one screw thread during operation of the adjustment assembly, such that the plastic coating is held against rotation on the at least one screw thread. It may be advantageous to provide a plurality of, possibly differently shaped, recesses, which are optionally arranged at a regular distance around the circumference of the at least one screw thread, such that the forces acting on the plastic coating can be optimally diverted.

Additionally or alternatively, the at least one screw thread can have an uneven surface topography, in particular imperfections and/or roughness, such that a form fit exists at least partially between the at least one screw thread and the plastic coating. The plastic coating is better able to form an at least partial form fit with the at least one screw thread due to the uneven surface topography because the plastic melt used to produce the plastic coating can penetrate into micro-depressions or imperfections in the surface.

To achieve an uneven surface topography, the surface of the at least one screw thread can be roughened. To roughen the surface, it can be treated with laser structuring, for example. It is also conceivable and possible that the surface is additionally or alternatively activated with a plasma or with a primer to enable a material bond with the plastic coating. To improve the connection between the at least one screw thread and the plastic coating, at least one recess can be provided as well as a roughened surface.

In one embodiment, at least one of the adjustment parts has an outer element, which is formed integrally with the plastic coating of the at least one screw thread. In particular, the first adjustment part can have such an outer element. For example, if the first adjustment part is a spindle nut, an adjustment part body of the first adjustment part may be a steel insert and the outer element may be a plastic overmolding of the steel insert.

The outer element can be molded on the plastic coating. For this purpose, the outer element can be arranged on an end face of the at least on screw thread. There may be a seamless transition between the plastic coating and the outer element.

In one embodiment, the outer element is formed from a different material than the plastic coating. The plastic coating can then be bonded to the outer element. For example, the plastic of the plastic coating can flow smoothly into a plastic of the outer element. Likewise, a mixing portion is conceivable and possible between the plastic coating and the outer element, at which the plastic of the plastic coating and the plastic of the outer element are mixed together in sections.

In one embodiment, the plastic coating and the outer element are made of the same material. For the plastic coating, polyoxymethylene (POM) can be provided, for example, such that it may be advantageous to also form the outer element from POM. Alternatively, polyamide (PA) can also be provided for the plastic coating.

Regardless of whether the same or different plastic materials are used for the outer element and the plastic coating, the outer element and the plastic coating can be injected together in one step using an injection molding process. This can make the production of at least one adjustment part easier and cheaper, while providing a seamless transition of the outer element into the plastic coating.

A mechanical interface can be formed on the outer element, which can be used, for example, to introduce an adjustment force into the at least one adjustment part. In the case of the first adjustment part, for example, an external toothing can be formed on the outer element. Furthermore, the outer element may additionally be used to provide a form fit between the adjustment part body and a plastic body formed by the outer element and the plastic coating together. For this purpose, the outer element can, for example, be positively connected to a projection of the adjustment part body. This can be achieved, for example, by engaging behind the projection and/or by a circumferential toothing arranged on the projection with which the outer element is in engagement.

The object is also achieved according to a second aspect of the solution by a method for producing an adjustment part for an adjustment assembly. In particular, the adjustment assembly can be an adjustment assembly according to the first aspect of the solution. The implementation of the method comprises the following steps.

In a first step, the adjustment part is provided with a screw thread. This can be, for example, a spindle nut with an internal screw thread or a spindle with an external screw thread.

In a second step, a receiving body is provided. The receiving body has a mating screw thread. The mating screw thread has a retaining portion configured to allow the screw thread to engage thereon in the mating screw thread. The mating screw thread and in particular its retaining portion can therefore be suitable for retaining the adjustment part on the receiving body via the screw thread. To hold the adjustment part on the receiving body, the retaining portion can be configured in such a way that there is no play between the mating screw thread and the screw thread. The screw thread can therefore preferably be held firmly in a defined position on the retaining portion. For the length of the retaining portion, the above applies in connection with a length of the second portion of the at least one screw thread. In particular, the second retaining portion can have an axial length that corresponds to at least one rotation of the screw turn, in particular at most four rotations of the screw turn, of the at least one screw thread. Equivalently or alternatively, the second retaining portion have an axial length that is at most 20%, in particular at most 15%, in particular at most 10%, of an overall length of the mating screw thread. The retaining portion can also be shorter than two rotations and, in particular, have a length that corresponds to the distance between two screw thread tips of the mating screw thread. For holding in a defined position, it can be of particular importance that the retaining portion is configured to ensure that the adjustment part is held firmly on the receiving body. For example, with a steep screw thread pitch of the mating screw thread, the retaining portion can be several rotations long.

The mating screw thread also has a gap portion, the radius of which is different from the radius of the retaining portion. In particular, the radius of the gap portion can be less than the radius of the retaining portion in the case of an external screw thread as a mating screw thread and greater than the radius of the retaining portion in the case of an internal screw thread as a mating screw thread. Additionally or alternatively, the flank width thereof can be different from a flank width of the retaining portion. In particular, the flank width of the gap portion can be narrower than the flank width of the retaining portion. In other words, the gap portion may differ from the retaining portion in that it is retracted into the mating screw thread relative to the retaining portion such that the adjustment part can only be retained with some play via the screw thread on the gap portion of the receiving body. The mating screw thread can therefore be configured on the gap portion to hold the adjustment part loosely or be configured such that the adjustment part can be arranged loosely thereon.

In a third step, the adjustment part is arranged on the receiving body, such that the adjustment part is held on the retaining portion and a gap is formed on the gap portion. The gap can be formed by the radius of the gap portion being different from the radius of the retaining portion. To arrange the adjustment part on the receiving body, it can be screwed onto or into the receiving body until the adjustment part reaches an end position, for example on a stop or a contact surface of the receiving body. It can thus be tightly screwed in or screwed on. The retaining portion may be arranged downstream of the gap portion along an arrangement direction of the adjustment part on the receiving body.

The receiving body can be arranged in a rotationally fixed manner. Preferably, the receiving body is a component, in particular a detachable component, of a tool for producing an adjustment part. It can be mounted in a fixed position. The adjustment part can be arranged, for example, by rotating the adjustment part in the receiving body. A screwing-in arrangement may be suitable for a receiving body with an internal screw thread and an adjustment part with an external screw thread, such as a spindle. Alternatively, the adjustment part can be arranged by screwing the adjustment part onto the receiving body. A screwing-on arrangement may be suitable for a receiving body with an external screw thread. For example, such a receiving body can have a free-standing screw thread core onto which the adjustment part, in particular a spindle nut, is screwed.

By holding the adjustment part on the retaining portion in a defined position, the gap that may result from the play between the adjustment part and the mating screw thread on the gap portion can be well defined. In particular, the gap can be rotationally symmetrical to a screw thread axis of the adjustment part.

In a fourth step, plastic is introduced into the gap. The plastic can be introduced in such a way that the gap is completely filled with plastic. At least one recess that may be present on the screw thread of the adjustment part can also be filled. Likewise, all thread turns of the screw thread located on the gap portion of the mating screw thread are covered with plastic. A portion of the thread of the adjustment part located on the gap portion may form a first portion described above. Since the adjustment part is held without play on the retaining portion of the mating screw thread via another second portion of the screw thread described above, the second portion cannot be covered with plastic, such that the plastic coating covers more than 50% but less than 100% of the screw thread. The second portion can be removed from the adjustment part after removing the adjustment part from the receiving body, for example by grinding.

Holding the adjustment part on the retaining portion of the mating screw thread enables simple and cost-effective production of the adjustment part for the adjustment assembly, wherein the desired dimensions of the plastic coating can also be achieved within the required tolerances, in particular due to the well-defined gap.

The production of the adjustment part with the aid of the receiving body also makes it possible, in particular, to achieve a desired shape of the plastic coating in a simple manner by forming the profile of the mating screw thread. This is because the profile of the mating screw thread makes it possible to configure a shape of the gap and thus of the plastic coating as desired.

In addition, at the same time as the plastic is introduced into the gap, an outer element of the adjustment part can be molded, if necessary, with an outer toothing. A plastic melt can be particularly suitable for introducing plastic into the gap. The plastic melt can be used to fill the gap. The liquid plastic can flow around the screw thread and also into at least one recess that may be present.

The plastic can be introduced into the gap along a direction parallel to a screw thread axis of the screw thread. This can mean that the plastic is introduced into the gap along the thread turn of the screw thread, for example, but also across the screw thread tips. The plastic, in particular the plastic melt, can be free to spread along a lateral surface of the screw thread in the gap.

In one embodiment, the plastic is introduced into the gap over the entire circumference of the screw thread. In other words, the plastic can be introduced into the gap from any direction. Preferably, the plastic is introduced into the gap from all directions, over the entire circumference of the screw thread, because this allows the production to take place particularly quickly.

An injection molding method may be particularly suitable for such a method.

In one embodiment, the adjustment part is axially aligned and/or rotationally aligned over the flank width via a contact surface of the receiving body when it is arranged on the receiving body. The axial alignment of the adjustment part can comprise an axial screw-in or screw-on depth of the adjustment part. In principle, the axial alignment can be ensured via an (internal) stop by the screw thread itself, by screwing the adjustment part onto the receiving body up to one end of the screw thread or by screwing it into the receiving body.

However, the axial alignment of the adjustment part can also be defined via the contact surface of the receiving body. For this purpose, the adjustment part can have a projection projecting in a plane perpendicular to the screw thread axis. The contact surface can be configured such that the projection abuts against the receiving body when the adjustment part is arranged thereon. In addition to the resulting inevitable axial alignment of the adjustment part, a radial alignment of the adjustment part can also be made possible via the contact surface. It is therefore also conceivable and possible that the adjustment part is also held with play on the retaining portion on the receiving body because the radial alignment is established simply by the interaction of the projection with the contact surface. Of course, the adjustment part can also be held without play on the retaining portion to improve radial alignment.

The rotational alignment of the adjustment part can be made possible by a predetermined number of rotations required to place the adjustment part on the receiving body in the desired position. This can be achieved in that the flank width is configured to narrow the screw thread such that the adjustment part can be screwed to the receiving body on the block.

The method can be used for producing an adjustment part for an adjustment assembly according to the first aspect of the solution.

BRIEF DESCRIPTION OF THE DRAWINGS

The idea underlying the solution will be explained in more detail below with reference to the exemplary embodiments shown in the figures.

FIG. 1 shows a sectional view of a conventional adjustment part with an adjustment part body made of steel.

FIG. 2 shows a sectional view of a conventional adjustment part with an adjustment part body made of steel and an external screw thread made of plastic.

FIG. 3 shows a sectional view of an adjustment assembly with a plastic coating.

DETAILED DESCRIPTION

Figure 4:
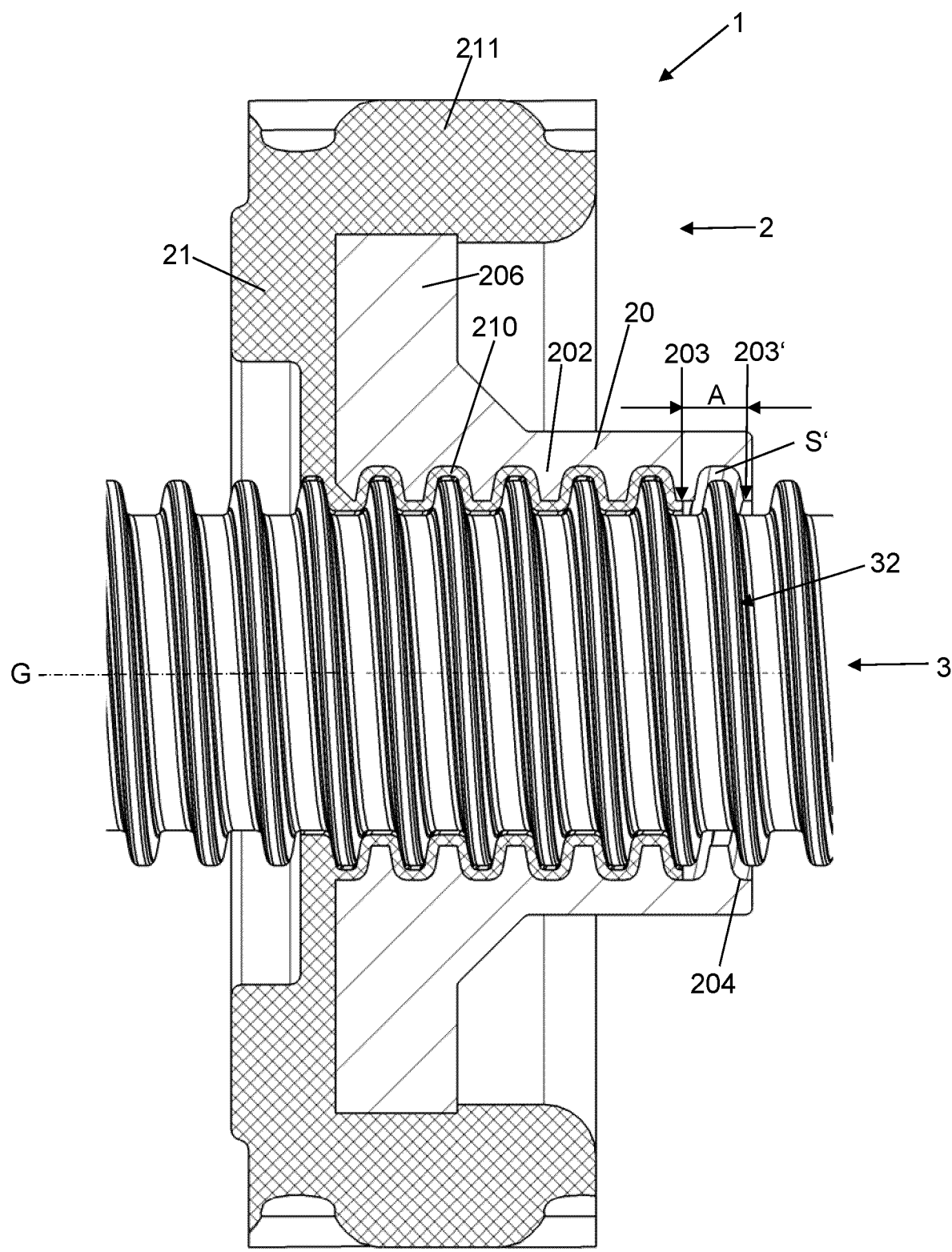
FIG. 4 shows a sectional view of an adjustment assembly with a first adjustment part with a first screw thread, which has a first and a second portion.

FIG. 1 shows a conventional first adjustment part 2, which is configured as a spindle nut. The first adjustment part 2 comprises a first adjustment part body 20, which is configured as a strength part. In the present case, the strength part is a metal nut with a metal screw thread as a first screw thread 202. The first screw thread 202 is an internal screw thread, which is configured to be in engagement with the external screw thread of a second adjustment part 3, for example a spindle. An outer element 21 is molded onto the first adjustment part body 20, which is made of plastic. The outer element 21 has an outer toothing 211. The outer toothing 211 is configured to be in engagement with a drive worm. The metal screw thread of such a first adjustment part 2 can absorb high axial forces, such as may occur in the event of a crash because the metal screw thread provides sufficient strength; however, undesirable noises, such as squeaking, may occur during normal operation if the metal thread is insufficiently lubricated, for example.

FIG. 2 shows a further exemplary embodiment of a conventional first adjustment part 2. The first adjustment part 2 comprises a first adjustment part body 20, a first screw thread 202, which is made of metal and is configured to be in engagement with a second screw thread of a second adjustment part 3, and an outer element 21, which is molded onto the first adjustment part body 20. In addition to the exemplary embodiment shown in FIG. 1, the outer element 21 additionally comprises an external screw thread 212, which is configured as an internal screw thread and is also configured to be in engagement with a second adjustment part 3. The first and the external screw thread 202, 212 are arranged next to each other along a common screw thread axis G. A radius of the first screw thread 202 is greater than a radius of the external screw thread 212, such that in normal operation the second adjustment part 3 has play to the first thread 202. In normal operation, this may prevent unwanted noise if the first adjustment part 2 does not tilt too much towards the second adjustment part 3. In normal operation, the second adjustment part 3 is in engagement with the external screw thread 212. Therefore, it has no play to the external screw thread 212. The external screw thread 212 is made of plastic. Therefore, the second adjustment part 3 can be adjusted with less friction and thus less wear, higher efficiency and with smoother running. Under load, and in particular in the event of a crash, an axial force acts on the second adjustment part 3 along the screw thread axis G, causing the external screw thread 212 to be deformed and the second adjustment part 3 to engage with the first screw thread 202. Thus, the first screw thread 202 supports the second adjustment part 3.

Such a first adjustment part 2 can improve the tribological properties, but may have the disadvantage that a relatively large installation space is occupied along the screw thread axis G by the adjacently arranged screw threads 202, 212. There is also the possibility of accidental contact between the second adjustment part 2 and the first screw thread 202 during normal operation, such that unwanted noise cannot be ruled out with complete certainty.

FIG. 3 shows an exemplary embodiment of an adjustment assembly 1 according to the proposed solution. The adjustment assembly 1 comprises a first adjustment part 2 with a first screw thread 202 and a second adjustment part 3 with a second screw thread 32. The second screw thread 32 is in contact with the first screw thread 202. The first adjustment part 2 is a single-threaded spindle nut, which has a first adjustment part body 20 made of metal, in particular steel. In principle, the first adjustment part 2 can of course also be multi-threaded and/or made of another material that provides sufficient strength.

The first screw thread 202 is trapezoidal in shape, which has the advantage of being highly resistant to forces occurring in the event of a crash, wherein other shapes are of course conceivable and possible. In this exemplary embodiment, the first screw thread 202 is an internal screw thread of the spindle nut.

The second adjustment part 3 is a spindle. The second adjustment part comprises a second screw thread 32 in the form of an exemplary trapezoidal external screw thread. The second adjustment part 3 is arranged coaxially to the first adjustment part 2 and, for example, longitudinally adjustable by a rotation of the (for example fixed) first adjustment part 2 along the common screw thread axis G.

In addition, the first screw thread 202 has a plastic coating 210. The plastic coating 210 completely covers the portion shown of the first screw thread 202. It forms a skin-like layer with a constant thickness D, with which the first screw thread 202 is coated. In principle, of course, the second screw thread 32 can also be additionally or alternatively coated with plastic. By placing a plastic coating 210, 30 between the first and second screw threads 202, 32, the tribological properties are improved during normal operation. The plastic coating 210 is supported by the underlying first screw thread 202. As a result, when the second adjustment part 3 is loaded along the common screw thread axis G against the first adjustment part 2, no bending stress results on the plastic at high load. The plastic layer only has to transmit compressive forces, wherein the surface pressure is influenced by the screw thread geometry, the screw thread tooth height, the diameter and the screw thread length.

The first adjustment part 2 also has an outer element 21, which is formed integrally with the plastic coating 210 of the first screw thread 202. The outer element 21 and the plastic coating 210 form a contiguous plastic body, which almost completely covers the first screw thread 202 and additionally extends over an outer area of the first adjustment part 2. An outer toothing 211 is also formed on the outer element 21. The outer toothing 211 is configured such that a drive worm of an adjusting gear for adjusting the second adjustment part 3 can engage in the outer toothing 211 via the first adjustment part 2.

The outer element 21 engages behind an annular projection 206 of the first adjustment part 2. As a result, the plastic coating 210 is held in a form-fitting manner to the first adjustment part 2 via the outer element 21. Such a form fit may be provided additionally or alternatively to the at least one recess 205 described below or a roughened surface of the at least one screw thread 202, 32.

FIG. 4 shows a further exemplary embodiment of an adjustment assembly 1 having a first adjustment part 2 having a first screw thread 202 and a second adjustment part 3 having a second screw thread 32, which is in engagement with the first screw thread 202. The first screw thread 202 has a plastic coating 210, which almost completely covers the first screw thread 202. This means that more than 50% and less than 100% of the first screw thread 202 is covered. Specifically, between 80% and 85% of the first screw thread 202 is covered with plastic. The thread turn comprises six rotations, of which five are covered with plastic, such that the covering corresponds to approx. 83.3%. The first screw thread 202 has a first portion covered by the plastic coating 210 and a second portion not covered by the plastic coating 210. The plastic coating 210 is arranged between the first and the second adjustment part 2, 3 on the first portion, such that at the first portion the first and second screw threads 202, 32 are in engagement with each other without play. A gap S' is formed on the second portion. The first screw thread 202 is spaced from the second screw thread 32 by the gap S'. Therefore, the first and second screw threads 202, 32 have clearance with each other at the second portion. The occurrence of unwanted noises can nevertheless be excluded with a high degree of certainty because the second adjustment part 3 is held on the first portion such that it cannot tilt and because the second portion is very short relative to the first portion. Specifically, the length ratio between the first and the second portions is 5 to 1.

The second portion has a length along the screw thread axis G that corresponds to the distance A between two adjacent screw thread tips 203, 203'. This corresponds to a portion of a thread turn 204 of the first screw thread 202, which traverses at least 360°, i.e. once a full circumference of the first screw thread 202. This is a rotation of the first screw thread 202. In principle, the second portion can be longer than the distance A between two adjacent screw thread tips 203, 203'. The first portion, on the other hand, has a length that is more than four times the distance A between two adjacent screw thread tips 203, 203'. Specifically, the length of the first portion is five times A. In principle, the first portion can be shorter or longer than four times the distance A between two screw thread tips 203, 203'. In particular, the length of the first portion is independent of a length of the second portion as long as the second portion has a length of x turns for a number of N turns of the first screw thread 202 and the condition x/N<0.5 is met. The first portion forms a contiguous portion of the first screw thread 202 over which the plastic coating 210 extends.

The first portion is arranged at one end of the first screw thread 202 and the second portion is arranged at the other end of the first screw thread 202. An outer element 21 is molded onto the first portion. The outer element 21 forms a continuous plastic body with the plastic coating 210, as already described in connection with FIG. 3.

Figure 5:
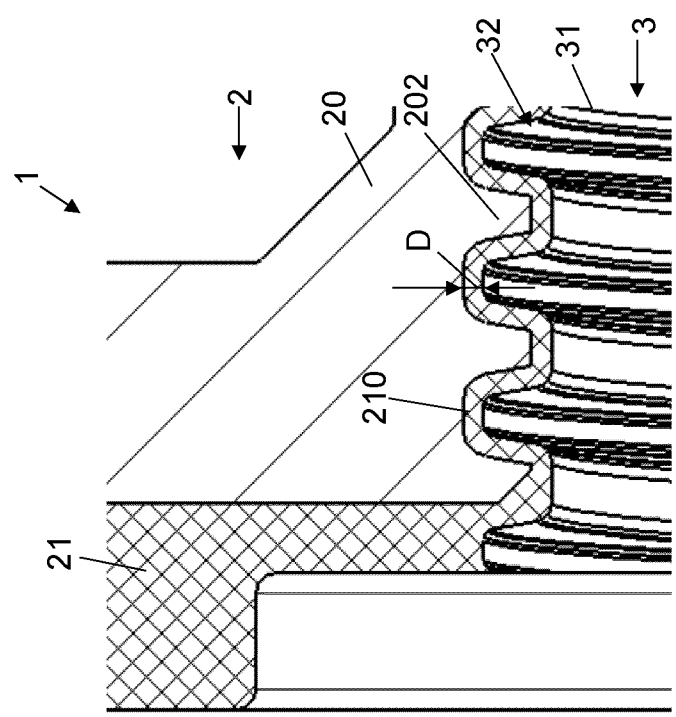
FIG. 5 shows a detailed view of an adjustment assembly with a plastic coating and an outer element.

FIG. 5 shows a detailed view of an adjustment assembly 1. From this it can be seen that the plastic coating 210 has a constant thickness D. In particular, the thickness D of the plastic coating 210 at a screw thread tip of the first screw thread 202 is the same as at a screw thread base of the first screw thread 202. Thus, the plastic coating 210 replicates the profile of the first screw thread 202. The first screw thread 202 is trapezoidal in shape, such that the plastic coating 210 also has a trapezoidal profile. However, the profile formed by the plastic coating 210 is wider and higher than the profile of the first screw thread 202. Ultimately, the profile of the first screw thread 202 is formed by the plastic coating 210 of the first screw thread 202, even though the plastic coating 210 replicates the profile of the first screw thread 202.

Figure 6:
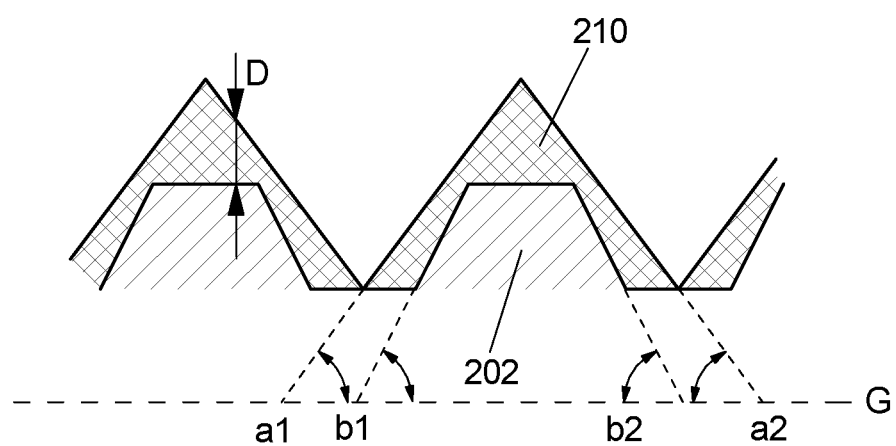
FIG. 6 shows a sectional view of a screw thread with a plastic coating.

The plastic coating 210 can be used to cover the profile of the first (or even the second) screw thread 202, 32 with any profile to form it. This allows the plastic coating 210 to imprint the profile of the screw thread 202, 32. An exemplary embodiment variant for the screw thread 202 is shown in FIG. 6. Likewise, it applies to the screw thread 32, for example. FIG. 6 shows a thread 202 with a plastic coating 210, the thickness D of which varies periodically along an axial direction of the screw thread 202. The screw thread 202 has a trapezoidal profile, the screw thread flanks of which include angles b1 and b2 to the screw thread axis G. The profile of the screw thread 202 is covered by the plastic coating 210, which is triangular in shape and the screw threads of which include flank angles a1 and a2 to the screw thread axis G. The first flank angle a1 of the plastic coating 210 is identical to the second flank angle a2 of the plastic coating 210. The first flank angle b1 of the screw thread 202 is identical to the second flank angle b2 of the screw thread 202. The identical flank angles a1 and a2 of the plastic coating 210 are different to the identical flank angles b1 and b2 of the screw thread 202, specifically larger (a1, a2>b1, b2). In principle, the flank angles a1, a2, b1, b2 can also be identical (a1, a2=b1, b2). The function of the trapezoidal profile of the screw thread 202 can be seen here in that its flanks support the plastic coating 210 in the event of a crash. This can prevent the plastic thread from yielding to the crash forces and/or being plastically deformed and no longer being able to run after the crash. With such a screw thread 202, the advantages of a strength-imparting metal thread can be combined with a plastic thread that has good tribological properties.

The trapezoidal profile is only shown as an example. In principle, the first and second flank angles a1, a2 of the plastic coating 210 can be different (a1<>a2). For example, the first flank angle a1 can be steeper than the second flank angle a2, for example to enable better wear protection on one side. Similarly, the first and second flank angles b1, b2 of the first (or even the second) thread 202, 32 may be different (b1<>b2) to allow better support of the plastic coating 210. Thus, by selecting the flank angles, asymmetrical screw thread tooth forms can be realized both for the plastic coating 210 and for the first and/or the second screw thread 202, 32.

In principle, a plastic coating 210 of any shape can be arranged on any profile shapes of the screw thread 202. In particular, it is also conceivable and possible that the screw thread 202 has a first profile shape at a first profile portion and a second profile shape at a second profile portion, which is different from the first profile shape. This can be achieved, for example, by different flank shapes, wherein, for example, a first flank shape is optimized for normal operation and a second flank shape is optimized for supporting the plastic thread in the event of a crash. The plastic coating 210 may form a profile, which may be symmetrical or asymmetrical on the screw thread teeth of the underlying screw thread 202, 32. An asymmetric profile can be used to provide better protection against wear for directional loads.

Figure 7:
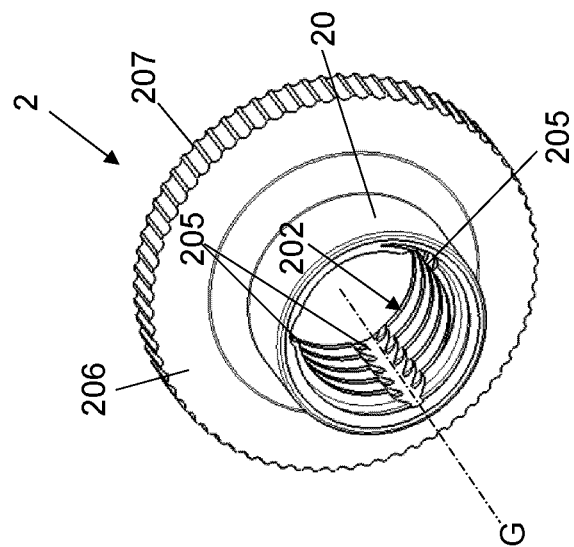
FIG. 7 shows an adjustment part with a first screw thread with three recesses.

FIG. 7 shows a first adjustment part 2 having a first adjustment part body 20. The first adjustment part body 20 has a first screw thread 202, which is configured as an internal screw thread. The screw thread 202 has three recesses 205, which are provided to be filled with plastic. In principle, any number of recesses 205 can be provided. The recesses 205 are extended in an aisle-like manner along a screw thread axis G of the first screw thread 202 from one end of the screw thread 202 to the other end of the screw thread 202. The recesses 205 form interruptions of the screw threads. This is achieved by the fact that the screw thread tips 203, 203' are worn down to the bottom of the screw thread. A width of the recesses 205 corresponds to 10° of the screw thread circumference in each case. The recesses 205 are equally distributed along the circumference of the first screw thread 202. In principle, a plurality of recesses 205 is conceivable and possible, and each of which can have widths corresponding to angular segments of the screw thread circumference between 1° and 30°. Likewise, other arrangements and shapes of recesses 205 are conceivable and possible, such as, for example, a recess 205 extending radially with respect to the screw thread axis G into the first screw thread 202.

The first adjustment part body 20 has an annular projection 206 formed thereon. The annular projection 206 has a circumferential surface forming a shell, on which a toothing 207 is arranged. The toothing 207 has longitudinally extended teeth that extend parallel to a screw thread axis G of the first screw thread 202 of the first adjustment part 2.

Figure 8B:
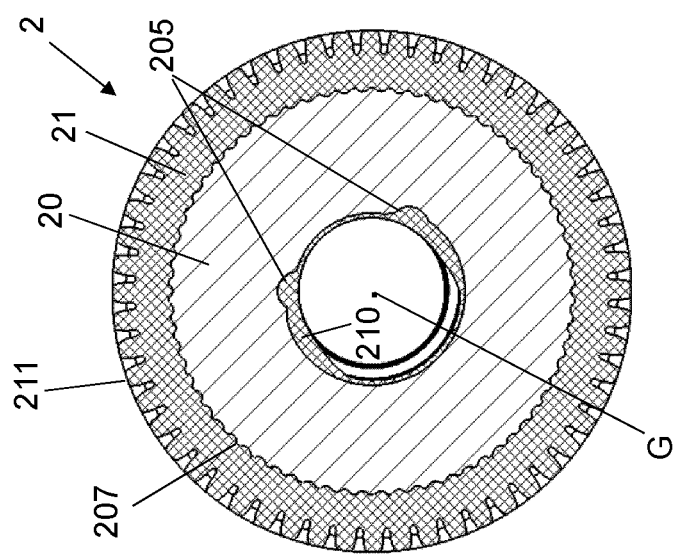
FIG. 8B shows a sectional view of an adjustment part along the sectional plane in FIG. 8A.
Figure 8A:
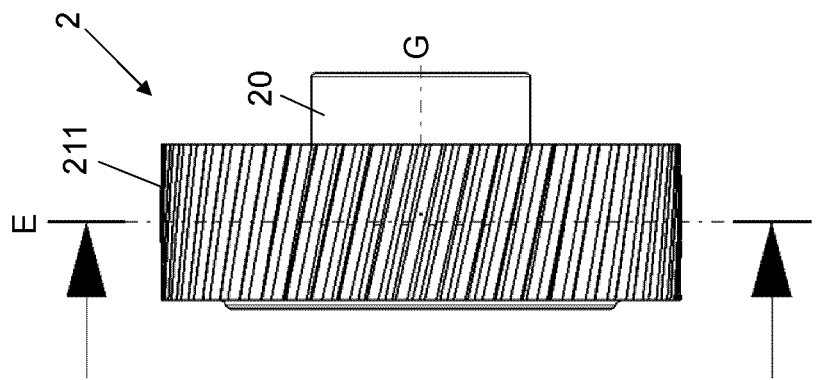
FIG. 8A shows a sectional view of a first adjustment part with an outer toothing.

FIG. 8A shows the first adjustment part 2 having an outer element molded onto the first adjustment part body 20. Preferably, the outer element 21 is molded on together with the plastic coating 210. The outer element 21 has an outer toothing 211, which is formed as a helical toothing. In principle, the outer toothing 211 can be configured in any way; in particular, a straight toothing is also conceivable and possible.

FIG. 8B shows a section through the first adjustment part 2 shown in FIG. 8A along the sectional plane E illustrated therein. The teeth of the outer toothing 211 are extended obliquely to the screw thread axis G in a clockwise tangential direction about the screw thread axis G. The first screw thread 202 has a plastic coating 210, which fills the two recesses 205 on the first screw thread 202. At the location of the recesses 205, the plastic coating 210 completes the interrupted thread turns. This is realized by the plastic coating 210 forming a profile at the recesses 205 that corresponds to the profile of the first screw thread 202 with plastic coating 210 away from the recesses 205. Thus, the first screw thread 202 has a plastic coating 210 forming a contiguous screw thread profile, wherein the screw thread profile is supported in sections by the first screw thread 202.

The outer element 21 is circumferentially arranged on the projection 206 of the first adjustment part body 20. A toothing 207 of the projection 206 of the first adjustment part body 20 engages the outer element 21 along a circumferential direction. The toothing 207 of the projection 206 and the recesses 205 may be provided together on the first adjustment part 2. However, each of the features can also be provided independently of the other.

When using the first adjustment part 2 in an adjustment assembly 1 for adjusting, for example, an adjustment drive in a motor vehicle, it may be necessary to establish a force flow between the external toothing 211 and the plastic coating 210. For this purpose, the outer element 21 must be arranged non-rotatably on the adjustment part body 20. This means that the outer element 21 must drive the first adjustment part body 20 when it is driven, for example, by a drive worm. For this purpose, among other things, the toothing 207 may be provided on the projection 206, which creates a positive fit between the outer element 21 and the first adjustment part body 20. In addition, the outer element 21 may be integrally formed with the plastic coating 210 such that a direct force flow is also established between the plastic coating 210 and the outer toothing 211. Furthermore, the recesses 205 ensure that there is a force flow between the adjustment part body 20, which is driven via the external toothing 211, and the plastic coating 210. Due to the recesses 205, the plastic coating 210 is arranged on the first adjustment part body 20 in a rotationally fixed manner.

To ensure a form fit between the first thread 202 and the plastic coating 210, a surface of the first thread 202 may have a non-uniform surface topography additionally or alternatively to providing recesses 205. Combinations of recesses 205 with different shapes are also conceivable and possible.

Figure 9:
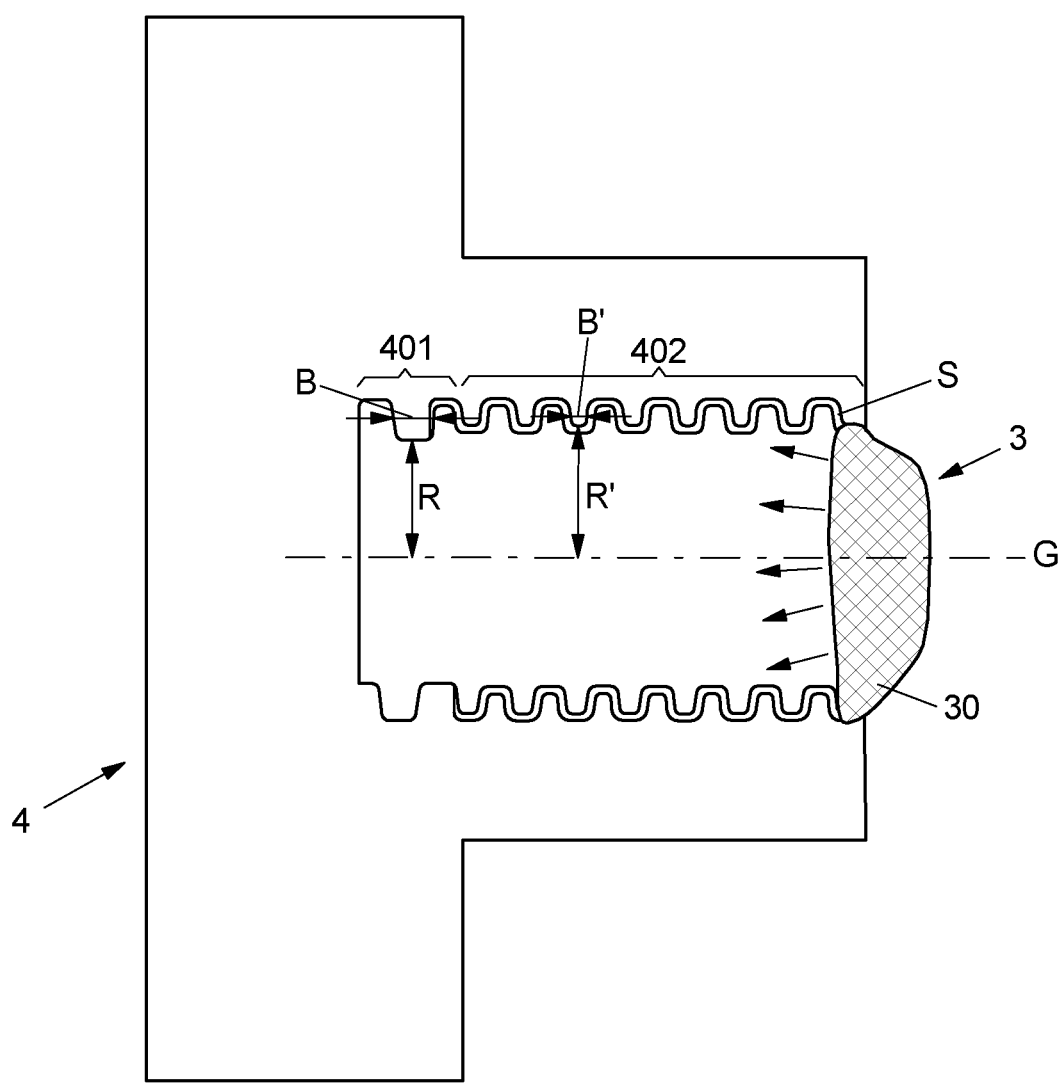
FIG. 9 shows a section of a method for producing an adjustment part with an external screw thread.

FIG. 9 shows a section of a method for producing an adjustment part 3 for an adjustment assembly 1. The method may in particular be an injection molding method, which may be used to produce the plastic coating 30 and optionally an outer element. The adjustment part 3 has a screw thread 32, which is configured as an internal screw thread. The method is carried out with the receiving body 4 shown, which has a mating screw thread 40 to the screw thread 32 of the adjustment part 3. The mating screw thread 40 has a retaining portion 401 configured to allow the screw thread 32 of the adjustment part 3 to engage thereon in the mating screw thread 40. The screw thread 32 and the mating screw thread 40 on the retaining portion 401 are formed to match each other. The adjustment part 3 can therefore be held on the receiving body 4 without play via the mating screw thread 40 by screwing it into the retaining portion on the block.

In addition, the mating screw thread 40 has a gap portion 402. The radius R' of the gap portion 402 is greater than the radius R of the retaining portion 401 and a flank width B' of the screw thread on the gap portion 402 is narrower than a flank width B of the screw thread on the retaining portion 401. The screw thread 32 and mating screw thread 40 therefore also fit into each other on the gap portion 402, but have play relative to each other. The retaining portion 401 is arranged behind the gap portion 402 along a screw-in direction into the mating screw thread 40. It closes the mating screw thread 40 in this direction to such an extent that a stop is formed for the adjustment part 3, against which the adjustment part 3 can be screwed in on the block.

The receiving body 4 can be arranged in a fixed position. For example, the receiving body 4 can be arranged on a mold for plastic injection molding. The adjustment part 3 is arranged on the receiving body 4 by being screwed into the receiving body 4. It is screwed onto the block until it is axially fixed to the retaining portion 401. By being fixed to the retaining portion 401, the adjustment part 3 is positioned radially symmetrically to the screw thread axis G of the receiving body 4. To enable axial fixation, the retaining portion 401 must have a length that is at least equal to the distance between two screw thread tips of the screw thread 32 of the adjustment part 3. In other words, the retaining portion 401 should be configured to require the adjustment part 3 to complete at least one rotation in order to be screwed into the retaining portion 401. The thread turns of conventional screw threads are chamfered to allow better initial engagement with a mating screw thread 40 when screwing in. Such a chamfer can be up to three quarters of a rotation of a thread turn. When the retaining portion 401 is chamfered, it may be advantageous to provide a retaining portion 401 having a length at least equal to 1.5 times the distance between two screw thread tips of the screw thread 32 of the adjustment part 3. The fixation on the retaining portion 401 makes it possible to ensure that the gap S on the gap portion 402 is radially symmetrical within the required tolerance.

Plastic 30 is then inserted into the gap S. The plastic 30 can be introduced, for example, by filling the gap S with plastic melt. The plastic is introduced into the gap S along the circumference of the screw thread 32. This is represented by the plastic mass 30 penetrating parallel to the screw thread axis G in the direction of the retaining portion 401. The plastic is introduced over the entire circumference of the screw thread 32. In particular, it is not necessary to introduce the plastic along a screw thread or from a narrow, predetermined direction due to the defined formation of the gap S by fixing it to the retaining portion 401, such that fast, simple and inexpensive production is possible.

The shape of the gap S can be adapted via the formation of the gap portion 402, such that a plastic coating with a desired profile can be produced using the method described.

The method described in connection with FIG. 9 is particularly suitable for producing a plastic coating 30 on the screw thread 32 of a spindle.

Figure 10:
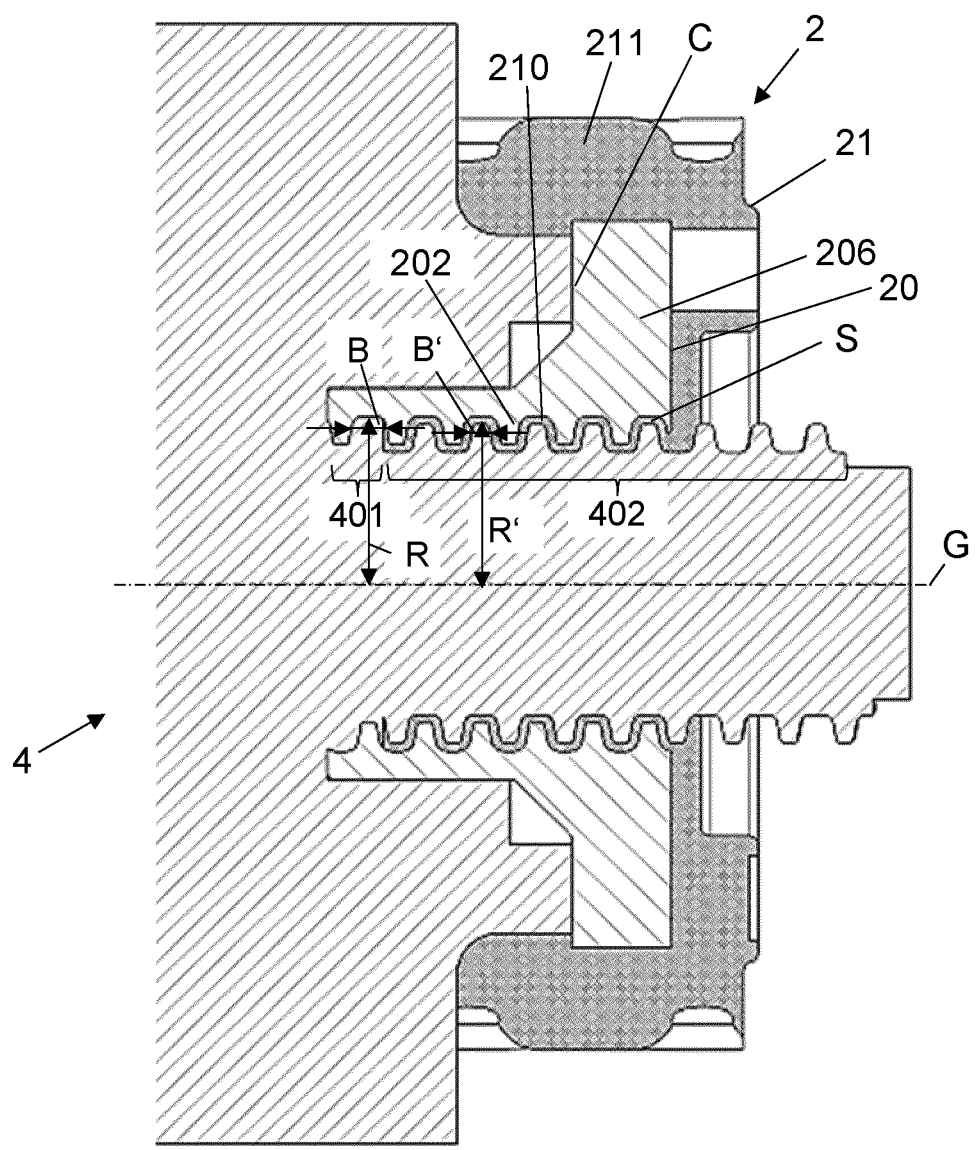
FIG. 10 shows a section of a method for producing an adjustment part with an internal screw thread.

FIG. 10 shows a step of a method for producing an adjustment part 2 for an adjustment assembly 1, wherein the adjustment part 2 has a screw thread 202, which is configured as an internal screw thread. The method is carried out with the receiving body 4 shown, which has a mating screw thread 40 to the screw thread 202 of the adjustment part 2, which is configured as an external screw thread. In particular, the receiving body 4 comprises a screw thread core, on which the external screw thread is arranged. The mating screw thread 40 has a retaining portion 401 and a gap portion 402, each as defined above. The radius R' of the gap portion 402 is less than the radius R of the retaining portion 401 and a flank width B' of the screw thread on the gap portion 402 is narrower than a flank width B of the screw thread on the retaining portion 401. Therefore, the screw thread 202 and mating screw thread 40 fit into each other on the gap portion 402 as described in connection with FIG. 9, but have play relative to each other.

The adjustment part body 20 is arranged on the receiving body 4 by being screwed onto the receiving body 4. It is screwed onto the block until it is axially fixed to the retaining portion 401. Here too, as described in connection with FIG. 9, the adjustment part 2 is positioned radially symmetrically to the screw thread axis G of the receiving body 4 by being fixed to the retaining portion 401. The retaining portion 401 must fulfil the same requirements as described in connection with FIG. 9. In addition, a contact surface C is provided on the receiving body 4, which cooperates with a projection 206 of the adjustment part body 20 projecting in a plane perpendicular to the screw thread axis G in such a way that it provides a stop against which the adjustment part body 20 abuts when it is screwed onto the receiving body 4. Through the interaction of the contact surface C and the projection 206, the adjustment part 20 is axially and radially fixed to the receiving body 4.

The plastic is introduced into the gap S in the same way as described in connection with FIG. 9, wherein the plastic can also be introduced over the entire circumference of the screw thread 202.

Simultaneously with the introduction of the plastic into the gap S, the outer element 21 of the adjustment part 2 shown in FIG. 10 can be molded. It engages behind the projection 206, as described in connection with FIG. 3, up to the contact surface C against which the projection 206 rests. In principle, different projections can be provided on the adjustment part 2 for cooperating with the contact surface C and for shaping the outer element 21. Simultaneous shaping of the outer element 21 allows the plastic coating 210 on the adjustment part 2 and the outer element 21 to be produced in one method step, which can save costs and increase production efficiency. If necessary, the plastic coating 210 may be made from a first plastic and the outer element 21 may be made from a second plastic in one method step. When produced in one method step, it can be ensured that the first plastic and the second plastic are materially bonded to each other.

The method described in connection with FIG. 10 is particularly suitable for producing a plastic coating 210 on the screw thread 202 of a spindle nut.

LIST OF REFERENCE NUMERALS

1 Adjustment assembly
2 First adjustment part
20 First adjustment part body
202 First screw thread
203, 203' Screw thread tip
204 Screw turn
205 Recess
206 Projection
207 Gearing
21 Outer element
210 Plastic coating 211 External gearing
212 Outer thread
3 Second adjustment part
30 Plastic coating
31 Second adjustment part body
32 Second screw thread
4 Receiving body
40 Mating screw thread
401 Retaining portion
402 Gap portion
A Distance
B, B' Flank width
C Contact surface
D Thickness
E Sectional plane
G Screw thread axis
R, R' Radius
S, S' Gap
a1, a2, b1, b2 Flank angle

The invention claimed is:

1. An adjustment assembly for an adjustment drive of a motor vehicle, comprising:
   a first adjustment part having a first screw thread, and
   a second adjustment part having a second screw thread, which is in engagement with the first screw thread, wherein
   at least one of the first and second screw threads comprises a plastic coating,
   wherein the at least one of the first and second screw threads comprises a first portion covered by the plastic coating and a second portion not covered by the plastic coating and arranged on one of the ends of the at least one of the first and second screw threads,
   wherein the plastic coating covers more than 50% and less than 100% of the at least one of the first and second screw threads, and
   wherein the second portion has an axial length, which corresponds to at least one rotation of a screw turn of the at least one of the first and second screw threads, and/or wherein the second portion has an axial length, which corresponds to at most 20% of the total length of the at least one of the first and second screw threads.

2. The adjustment assembly according to claim 1, wherein the first and/or the second screw thread is single-threaded.

3. The adjustment assembly according to claim 1, wherein the first and/or the second adjustment part consists of metal.

4. The adjustment assembly according to claim 1, wherein the first adjustment part is a spindle nut and the second adjustment part is a spindle.

5. The adjustment assembly according to claim 1, wherein the plastic coating has a greater thickness on a screw thread flank of the at least one screw thread facing a load end of the at least one screw thread than on a screw thread flank of the at least one screw thread facing away from the load end of the at least one screw thread.

6. The adjustment assembly according to claim 1, wherein a thickness of the plastic coating varies periodically along the at least one of the first and second screw threads.

7. The adjustment assembly according to claim 1, wherein the plastic coating has a constant thickness.

8. The adjustment assembly according to claim 1, wherein the plastic coating forms a profile of the at least one of the first and second screw threads.

9. The adjustment assembly according to claim 1, wherein the at least one of the first and second screw threads has a first profile shape on a first profile portion and a second profile shape on a second profile portion, which is different from the first profile shape.

10. The adjustment assembly according to claim 1, wherein the at least one of the first and second screw threads and the plastic coating on the at least one of the first and second screw threads have identical flank angles, different flank angles, or identical angles in at least one portion of the at least one of the first and second screw threads and different flank angles in at least one other portion of the at least one of the first and second screw threads.

11. The adjustment assembly according to claim 1, wherein the at least one of the first and second screw threads comprises at least one recess, which is filled with plastic and/or has an uneven surface topography, such that a form fit exists at least partially between the at least one of the first and second screw threads and the plastic coating.

12. The adjustment assembly according to claim 1, wherein at least one of the first and second adjustment parts comprises an outer element, which is formed integrally with the plastic coating.

13. The adjustment assembly according to claim 1, wherein the first adjustment part is a spindle nut and the second adjustment part is a spindle, and wherein the plastic coating covers more than 50% and less than 100% of the first screw thread of the spindle nut.

* * * * *